April 10, 1951  H. Z. GORA  2,548,303

MACHINE AND METHOD FOR MAKING JAR COVERS

Filed Jan. 25, 1945  5 Sheets-Sheet 1

INVENTOR
Henry Z. Gora
BY Johnson and Klaue
ATTORNEYS

April 10, 1951 H. Z. GORA 2,548,303
MACHINE AND METHOD FOR MAKING JAR COVERS
Filed Jan. 25, 1945 5 Sheets-Sheet 3

INVENTOR
*Henry Z. Gora*
BY *Johnson and Kline*
ATTORNEYS

April 10, 1951 — H. Z. GORA — 2,548,303
MACHINE AND METHOD FOR MAKING JAR COVERS
Filed Jan. 25, 1945 — 5 Sheets-Sheet 4

INVENTOR
Henry Z. Gora
BY Johnson and Kline
ATTORNEYS

Patented Apr. 10, 1951

2,548,303

UNITED STATES PATENT OFFICE 2,548,303

MACHINE AND METHOD FOR MAKING JAR COVERS

Henry Z. Gora, Stratford, Conn., assignor, by direct and mesne assignments, to The Gora-Lee Corporation, Bridgeport, Conn., a corporation of Connecticut Application January 25, 1945, Serial No. 574,555

27 Claims. (Cl. 18—5)

This invention relates to the manufacture of covers or lids for containers, of which the kind frequently used on preserving jars is taken as exemplary herein.

Such covers are usually made of sheet metal, although they may of course be made of molded compositions, and as heretofore made were provided with a coating of lacquer or paint on the inside surface of the cover or lid and an annular ring of resilient rubber or rubber-like material acting as a washer or gasket between the body of the lid and the mouth of the jar or container with which it is used. In use, such lids have not been entirely satisfactory, from the point of view of either the manufacturer or user, because of the cost of the operations of painting or lacquering the lid and producing the sealing ring, and because in the handling and use of such lids the paint frequently chipped or peeled off, and fell into the jar. The particles of paint mingled with the contents of the jar, and the exposed metal or material of the lid or oxides thereof frequently caused spoilage or contamination of the food in the container.

To avoid these difficulties, the present invention places over the entire inside surface of the lid a layer or coating of rubber or rubber-like material, which obviates the necessity of painting or lacquering the lid, and provides on the inside of the lid a protective coating of resilient, tough and tenacious material which will not crack or chip off as in the case of lacquer or paint.

The present invention further makes this coating as a thin membrane, except over the area usually occupied by the sealing ring, where the coating is made sufficiently thick to act as a sealing ring.

The improved lid of the present invention is disclosed and claimed in my copending applications S. N. 95,643, filed May 27, 1949, and S. N. 570,538, filed December 30, 1944. In the broader aspects of the invention disclosed in said co-pending applications, the improved lid may be made in any suitable or desirable way. The present application covers that part of my invention which concerns the methods and apparatus for manufacturing such improved lids, whereby they may be made efficiently and economically.

Reference is made to my co-pending applications Serial No. 607,226, filed July 26, 1945 and Serial No. 590,459, filed April 26, 1945, disclosing other specific and related methods and means for forming and applying gasket members to the undersides of caps or lids and to co-pending application Serial No. 642,193, filed January 19, 1946, which comprises a continuation in part of this and the above-mentioned applications. Application Serial No. 642,193 contains claims to the broader concept of the invention disclosed herein.

This is accomplished by bringing together the body of the lid and a blanked-out piece of rubber or rubber-like material and forming the latter, preferably under heat and pressure, on the inside surface of the body of the lid to provide a membrane covering and integral sealing ring bonded to said inside surface of the lid.

In carrying out the present invention, the lids may be placed on a suitable heated carrier and moved to a molding position where they are overlaid by a strip of prewarmed and preferably quite plastic rubber or rubber-like material from which is cut, by a suitable die, a blank which is then forced and pressed into the lid and formed into the desired shape by a forming die. As shown herein, the sealing material is heated and made plastic by a rubber mill from which the blank-forming strip is cut and fed to an adjacent molding station. Preferably, the remainder of the strip, or what would normally be the scrap, is fed back to the mill and thus there is no loss of material.

In one of the specific embodiments of the invention herein illustrated, the turned-down rim of the lid constitutes the die for cutting the blank from the strip and the punch constitutes also the forming die for pressing and forming the sealing material in the lid. In the form shown, the support for the lids comprises a drum having on its periphery a plurality of sockets or cavities to receive the lids with the inside surface extending outwardly, and this drum is heated so that while the lids are traveling they also become heated. The forming dies are also carried by a drum and the drums are so placed that the strip of sealing material passes downwardly between them, the drums being geared together so that the forming die will properly engage the sealing strip, cause it to be blanked out, and pressed into the lid. The cutting, pressing and molding may be done by a rolling or calendering operation, or as in an illustrated modification these operations may be performed by bringing the dies together in parallel relation at the instant of cutting, pressing and molding.

According to the present invention, the lids may be covered by a continuous operation, the plain bodies being fed to the device at one place and being ejected at another place with the sealing material covering on their inside surfaces.

Heretofore, in providing the annular sealing ring on container lids, it was the practice to provide the sealing compound in an annular depression in the lid in a liquid state and permit the same to settle into a more or less flattened condition. This produced irregularities which on occasions were such as to prevent a satisfactory seal between the lid and the container top. To avoid this, it was necessary to go to the trouble and expense of rolling or ironing the semiliquid sealing compound. These difficulties do not occur when the sealing ring is provided as by the present invention, since the material is actually formed and molded under heat and pressure directly on the lid where it is to function.

It will therefore be seen that the present invention may advantageously be employed to provide the sealing ring alone on a container lid where it is not necessary or desired to cover the surface of the lid with the membrane of sealing material. It should be understood therefore that the present invention embraces forming and applying on container lids, from a strip of sealing material, annular or marginal sealing bands either with or without the membrane which it is now considered preferable to employ to cover the inside surface of the lid.

According to the present invention in its broadest aspects, the sealing material may be so compounded as to be entirely self- or air-curing or partly so and partly heat-cured, or it may be entirely cured by heat, depending upon the lapse of time before the lids are to be used and the conditions under which they are used.

Other features and advantages will hereinafter appear.

Figure 1:
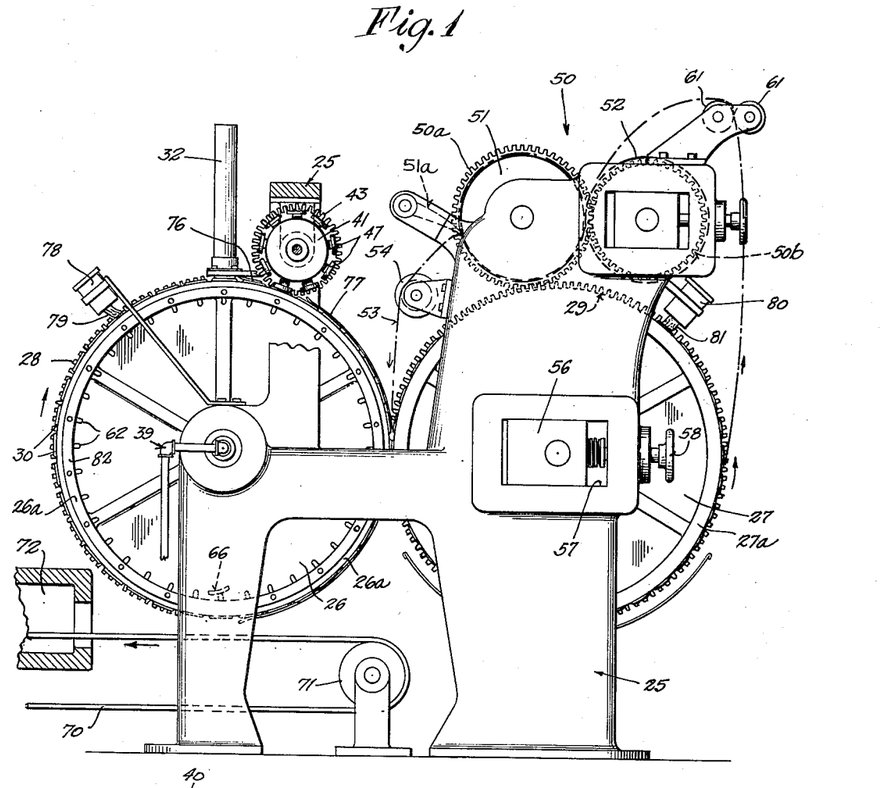
Figure 1 is a side elevation of a machine embodying the invention.

The method and apparatus of the present invention may be understood by referring to Figs. 1 through 9. As shown in Fig. 1, a machine is provided having an upright frame 25 on which are rotatably mounted wheels or drums 26 and 27, one ahead of the other, with their axes substantially parallel. The drums 26 and 27, which may be of the same diameter, are geared to rotate in opposite directions by meshed gear wheels 28 and 29, respectively secured to the drums. Power means (not shown) for driving the drums 26 and 27 may be applied to either of the gear wheels 28, 29 as desired, the rotation of the drums being in the direction indicated by the arrows in Figs. 1 and 3.

Figure 2:
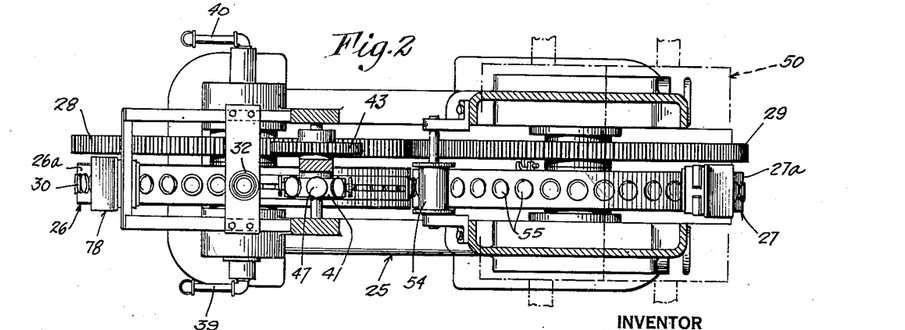
Fig. 2 is a top or plan view of the machine of Fig. 1, but with the rubber mill removed to reveal the drum carrying the molding heads.
Figures 3, 4:
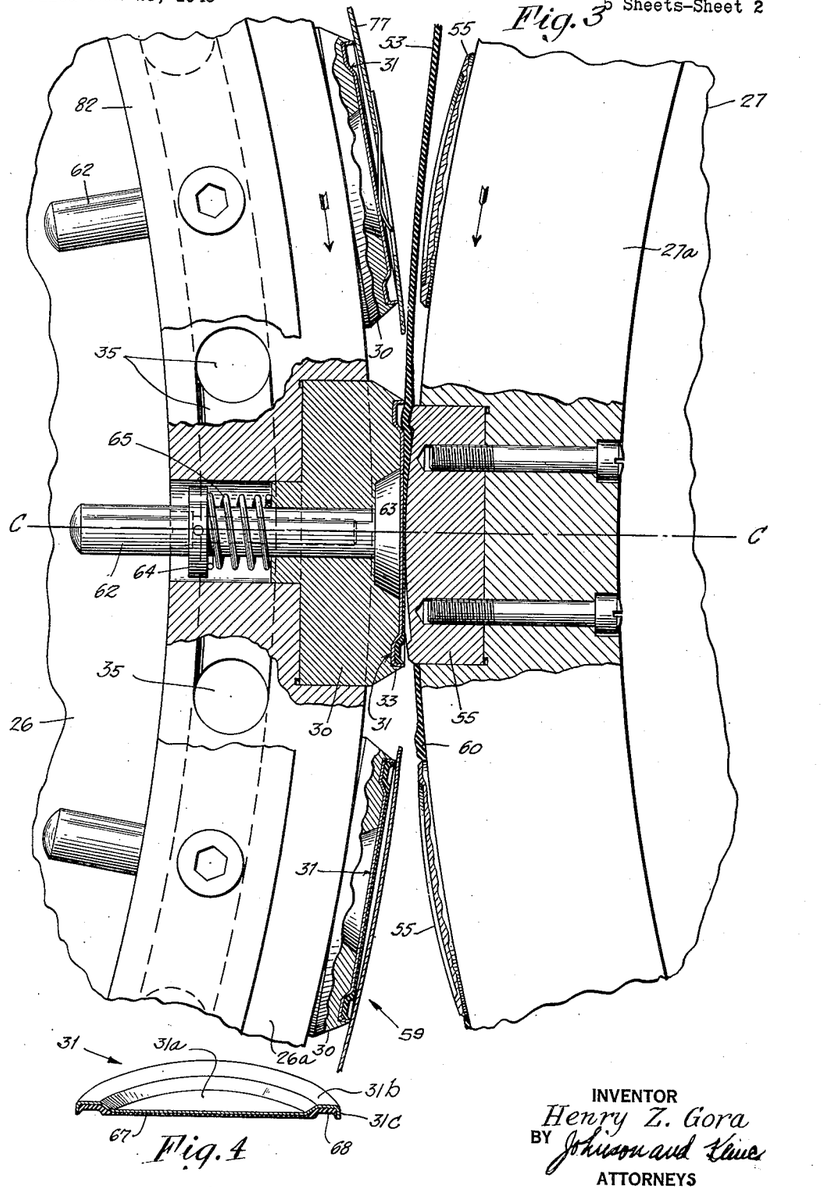
Fig. 3 is an enlarged fragmentary elevation-section of the juxtaposed portions of the drum peripheries, illustrating the blanking, molding and bonding operation in process of being carried out.
Fig. 4 is a diametric section taken through a coated lid made by the process as illustrated in Fig. 3.

As shown in Figs. 1, 2, 3 and 5, the rim 26a of the drum 26 has mounted on it a plurality of nests 30 for receiving and carrying lids 31 which may be formed of sheet metal, having a conventional shape as shown in Fig. 4. The lid shown in this figure comprises a central face portion 31a, an annular portion 31b embossed so as to be offset from the face portion, for cooperation with the edge of a jar, and a downturned peripheral flange 31c. A feed tube 32 adapted to carry a pile of stacked lids 31 is mounted at the top of the drum 26 closely adjacent the rim 26a, and arranged to deposit the lids one in each nest 30 as the drum rotates.

As seen in Fig. 3, each nest 30 is shaped to closely conform to the top and outside of the lids 31, a flange or lip 33 being provided on each nest for engaging and frictionally holding the flanges 31c of the lids. In effect, therefore, each nest 30 has a recess into which a lid 31 may be fitted, the walls of the recess comprising the lip 33.

The rim 26a of the drum 26 is provided with a continuous closed steam channel 35, Figs. 3, 5, 7 and 8, extending around the rim, the ends of the channel being respectively connected to bores 36 and 37 in the shaft 38 of the drum, the bores being connected with steam pipes 39 and 40 through suitable rotary couplings so that steam may be passed through the rim to heat the nests 30. The outside diameter of the flanges 31c of the lids 31 may be only very slightly smaller than the inside diameter of the lips 33 of the nests 30, so that when the cool lids are dropped from the feed pipe 32, they will bottom in the nests and upon becoming heated will expand sufficiently to cause the flanges 31c to frictionally seize and be held by the lips 33.

Figures 5, 6:
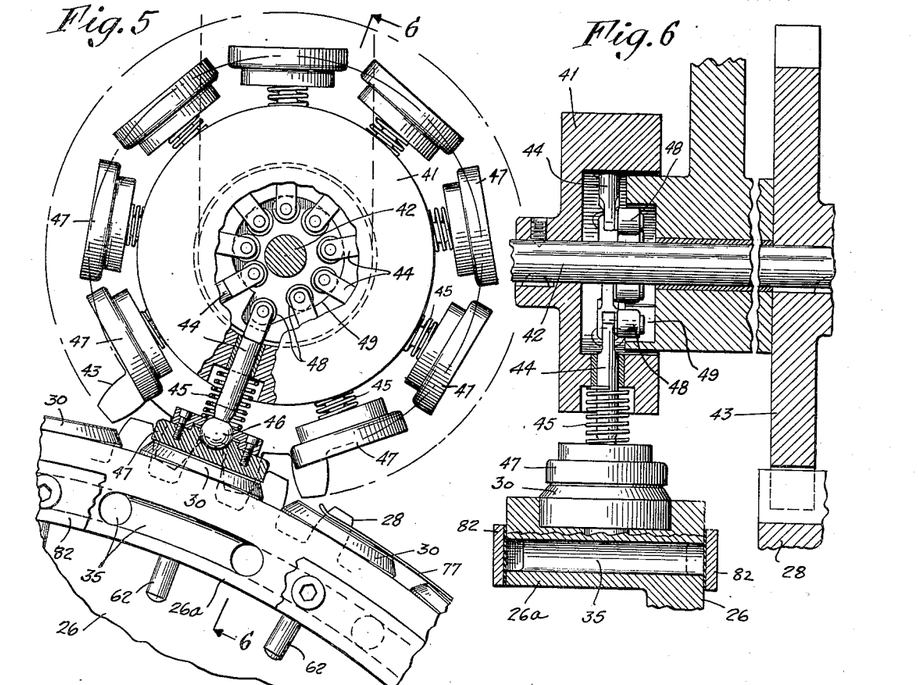
Fig. 5 is an enlarged fragmentary side elevation of the mechanism for forcing the formed lids deeply into the nests of the machine.
Fig. 6 is a section taken on the line 6—6 of Fig. 5.
Figure 7:
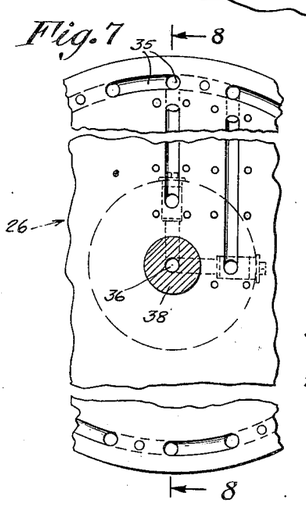
Fig. 7 is a fragmentary side elevation of the nest-carrying drum, with side plate removed to show the steam channels for heating the nests.

For the purpose of insuring the proper seating of the lids 31 in the nests 30, a seating device is provided adjacent the feed pipe 32, as shown in Figs. 1, 2, 5 and 6. This seating device comprises a drum 41 mounted on a spindle 42 carrying a gear 43 meshing with the gear 28. The drum 41 has a plurality of radially extending plungers 44 yieldably urged outward by compression springs 45, the outer ends of the plungers having balls 46 on which are floatably mounted heads or pads 47. The inner ends of the plungers 44 carry rollers 48 extending into a box cam 49 which controls the radial positioning of the plungers. As seen in Fig. 6, the cam 49 is carried by the frame 25 of the machine, and is therefore stationary.

Referring to Fig. 5, the cam 49 is shaped to permit the springs 45 to forcibly and suddenly move the plungers 44 radially outward when the plungers reach a position wherein they are adjacent the rim 26a of the drum 26, and aligned with the nests 30. When this occurs, the movement of the plungers 44 will cause the pads 47 carried thereby to strike the underside of the lids 31 carried in the nests 30, thereby positively fully seating the lids in the nests. After a blow has been struck by a pad 47 carried on a plunger 44, and as the drum 41 continues its rotation, the cam 49 will, suddenly at first and then more gradually, retract the plunger and pad, preparatory to its next release.

Referring to Fig. 1, a mill 50 is shown mounted above the drum 27, the mill comprising the usual rollers 51 and 52, whereby a rubber or other similar composition is kneaded, shaped and cut by knives 51a into the flat ribbon 53. This ribbon, which is warm, is then guided over a roller 54 and fed between the adjacent portions of the rims of the drums 26 and 27. The rollers 52 and 51 have meshed gears 50b and 50a respectively, the latter meshing with the gear 29 and being driven thereby.

For cooperation with the nests 30 of the rim 26a, and with the lids 31 carried thereby, the rim 27a of the drum 27 is provided with a plurality of molding heads 55, Fig. 3. As seen in this figure, the drums 26 and 27 are spaced so that the convex faces of the molding heads 55 extend very close to the undersides of the lids 31 at the common center plate C of the two drums, the locations of the molding heads being such that they are in registration with the nests 30 when closely adjacent the latter. This spacing of the drums 26 and 27 may be made adjustable by mounting bearing blocks 56 for the drum 27 in slides 57 in the frame 25, and by providing hand screws 58 as shown in Fig. 1.

Referring to Fig. 3 when the drums 26 and 27 rotate, and the moldable flat strip 53 is fed between the rims 26a and 27a the strip will pass between the nests 30 and molding heads 55 and move with these latter as they approach each other. Each nest 30 is carrying a lid 31, and as the leading edges of each nest and lid move closely adjacent the leading edge of the corresponding molding head, the latter, cooperating with flange 31c of the lid, will begin to shear the strip 53 and simultaneously press the blank being severed from the strip against the undersurface of the lid. As the movement of the drums 26 and 27 continues, the material of the strip 53 will be caused to flow upwardly, as viewed in Fig. 3, while the shearing of it is continuing. As shown in this figure, approximately the lower half of the lid 31 has been coated with the severed portion of the strip 53, said portion being accurately formed and molded to the desired shape and bonded to the lid. As the movement of the drums continues further, the blanking, molding and bonding of the sealing material of the strip 53 will be completed. A lid 31 carried in the nest 30 at the point indicated by the character 59, Fig. 3, is shown as being completely coated with the sealing substance of the strip 53, and the blanked residue 60 of the strip 53 is shown as following the rim 27a of the drum 27. The coating on the lid 31 will adhere to the latter due to the heat transferred from the nest 30, this heat being supplied to the nest by the steam in the channel 35. The heat initially softens and makes sticky the material of the strip 53, after which a curing of the material takes place. The molding heads 55 may be provided with smooth chromium plated surfaces, and since they are cooler than the lids and have such smooth plated surfaces, the molded coating on the lids 31 will readily part from them. Referring to Fig. 1, the blanked residue 60 of the strip 53 is brought around underneath the drum 27 and pulled upwardly through rollers 61, and thence again fed into the mill 50 to be used over again, so that none of the sealing material is wasted.

To provide for positively ejecting the lids 31 after they have been coated with the moldable sealing material from the strip 53 the nests 30 (Fig. 3) are provided with plungers 62 having heads 63 located in recesses in the nests, fitting flush with the nest bottoms. The plungers 62 have collars 64 engaging compression springs 65 by means of which the plungers are normally held in retracted position as shown. At the lower part of the drum 26 a shoe 66 is mounted on the frame 25 (Fig. 1) for engagement with the inner ends of the plungers 62, the shoe extending at an angle to cause the plungers to be projected, thereby ejecting the lids from the nests.

It will thus be seen that a novel method and apparatus is provided by this invention, whereby molded gasket coatings are produced on the undersides of container lids.

The lids 31, although formed of thin sheet metal, are able to withstand considerable pressure on their undersides because of the support of the nests 30, so that when the moldable strip 53 is interposed between the lids and the molding heads 55, the latter may press and form the strip material against the lids to provide molded sealing coatings on their undersides. In the broader aspects of the invention, the blanking of the strip 53 may be done separately from the forming and molding, although as shown herein by way of example, the blanking of the strip is accomplished at the same station as the molding thereof by the feeding of the continuous strip alongside the undersurface of the lid, and the cutting of the blank by the flanges 31c of the lid cooperating with a molding head 55. The moldable strip 53 may be quite plastic and soft, so that it flows readily, the composition preferably being such that it initially softens and becomes sticky when heated, and thereafter cures as the heating is continued.

The lids 31 may be heated before the molding of portions of the strip 53 to the undersides thereof, this heating causing the molded portion of the strip to tenaciously adhere to the underside of the lid. Also, it is preferred to have the molding heads 55 comparatively cool and provided with smooth chromium plated surfaces so that after the blanking and molding operations the heads may readily part from the molded portions of the strip.

As seen in Figs. 3 and 4, the underside of the lid 31 may be covered in its entirety by the sealing material from the strip 53, the face portion 31a of the lid having a circular membrane-like coating 67, the periphery of which at all points merges with a coated annular portion 68 adjacent the portions 31b of the lid. No sealing material from the strip 53 will be deposited on the outside of the peripheral flange 31c of the lid, due to the strip being blanked by the cooperating surfaces of the flange 31c and molding head 55.

For economical reasons I prefer to mold the membrane 67 thinner than the surrounding annulus or gasket 68, and I have found that the membrane may be as thin as .005" and still be satisfactorily bonded to the underside of the lid and prevent the contents of the container from coming in contact with the metal of the lid.

In the broader aspects of the invention, the lids 31 may be provided with coatings of moldable material in the shape of the gasket-ring 68 only, without providing the membrane 67, since the strip 53 may be punched to blank out an annulus which may be molded against and bonded to the portion 31b of the lid. Or, when a lid 31 is being supported by a nest 30 in molding position, the space between the underside of the portion 31a of the lid and the corresponding face of the molding head 55 may be eliminated, so that no moldable material may be formed against the portion 31a.

When the membrane 67 is provided, however, so that the entire underportion of the lid is coated and covered by the sealing material from the strip 53, the lid 31 need not be first lacquered or painted to prevent contact of the contents of a jar with the bare metal, and consequent spoilage or contamination of said contents, and the cost and time of this lacquering or painting operation is therefore eliminated.

The sealing material of the strip 53 is of a tenacious nature so that not only will it be securely bonded to the undersides of the lids 31, but in normal use it will not form cracks or break away and mix with the contents of a jar, to contaminate same.

It will be seen that the molding and bonding of the portions of the strip 53 to the undersides of the lids 31 is in the nature of a calendering operation, since the paths of the lids and nests, and of the molding heads cooperating with same, are curvilinear so that these parts have a rolling action.

Referring to Fig. 1, a conveyer belt 70 may be provided, running over a pulley 71 and extending under the drum 26 so that coated lids ejected from the periphery 26a of the drum will be deposited on the belt and carried away to a disposal point.

The sealing material of the strip 53 may be so compounded as to be entirely self or air curing, or only partly so and partly heat cured, or it may be entirely cured by heat. If it is of the heat-curing type, and it is desired to further cure the coatings of the lids after they have been ejected from the drum 26, an oven 72 may be provided through which the upper or discharge portion of the belt 70 passes. The oven may heat the lids, which are carried on the belt with their coated surfaces down, by radiation and convection, or by radio-frequency heating.

The novel and efficient method and apparatus provided above by the invention for producing an effective sealing gasket and/or coating bonded to the underside of a container lid is simple and economical to practice, and produces a very desirable sealing means which represents the utmost in sanitation and prevention of contamination when employed with food products. As may be readily seen, the apparatus for carrying out the method of the invention permits a high production rate in the coating of lids by the above method.

Figure 9:
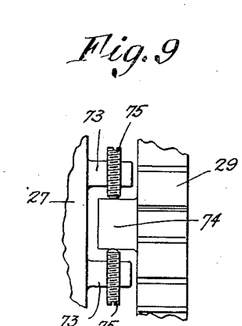
Fig. 9 is a fragmentary detail showing the adjustment means between the drum carrying the molding heads, and the gear for driving the drum.

For the purpose of adjusting the registration of the molding heads 55 and the nests 30, referring to Figs. 2 and 9, driving lugs 73 and 74 are provided on the drum 27 and gear wheel 29 respectively, the lugs 73 having adjusting screws 75 by which the relative positions of the drum and wheel may be altered.

If desired, as shown in Figs. 1 and 2, retaining rails 76 and 77 may be mounted on the frame 25 to prevent inadvertent premature ejection of the lids 31 from the nests 30.

At times it may be found desirable to coat the nests 30 with a liquid preparation to prevent corrosion of same and sticking of the lids, and accordingly as shown in Fig. 1, a container 78 having a wick 79 may be carried by the frame 25 to automatically accomplish this. Also, it may be desirable to coat the molding heads 55 with a liquid preparation and for this purpose a container 80 (Fig. 1) is mounted on the frame 25 and provided with a wick 81 for engaging the molding heads. As an alternative, the nests 30 and/or the molding heads 55 may be coated with a powder such as talc or suitable powdered oxide, to prevent sticking, instead of using a liquid preparation.

Figure 8:
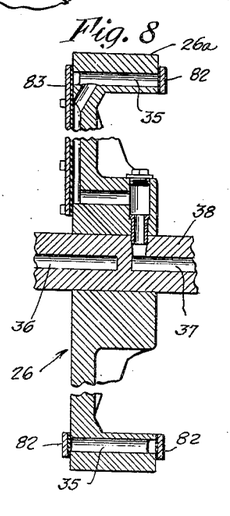
Fig. 8 is a section taken on the line 8—8 of Fig. 7.

Referring to Fig. 8, to facilitate the channeling of the drum 26, side plates 82 and 83 may be provided, so that the channels may be formed by boring the rim 26a and grooving the side face of the drum.

If desired, the drive for the drums of the machine may be accomplished through the gear 50a by applying power to same instead of to the gears 28 or 29.

A modification of the invention is shown in Figs. 10 through 15. According to this modification, molding heads are tiltably mounted on the drum 27 in a manner that they may be pivoted an extent by engagement with the nests of the drum 26, so that automatic alignment or parallelism of the heads and nests is accomplished at the time that the final molding and bonding of the sealing material occurs. As a result, the forming of the sealing material is not strictly a calendering or rolling operation but is more in the nature of a pressing operation.

Figures 10, 11, 12, 13, 14, 15:
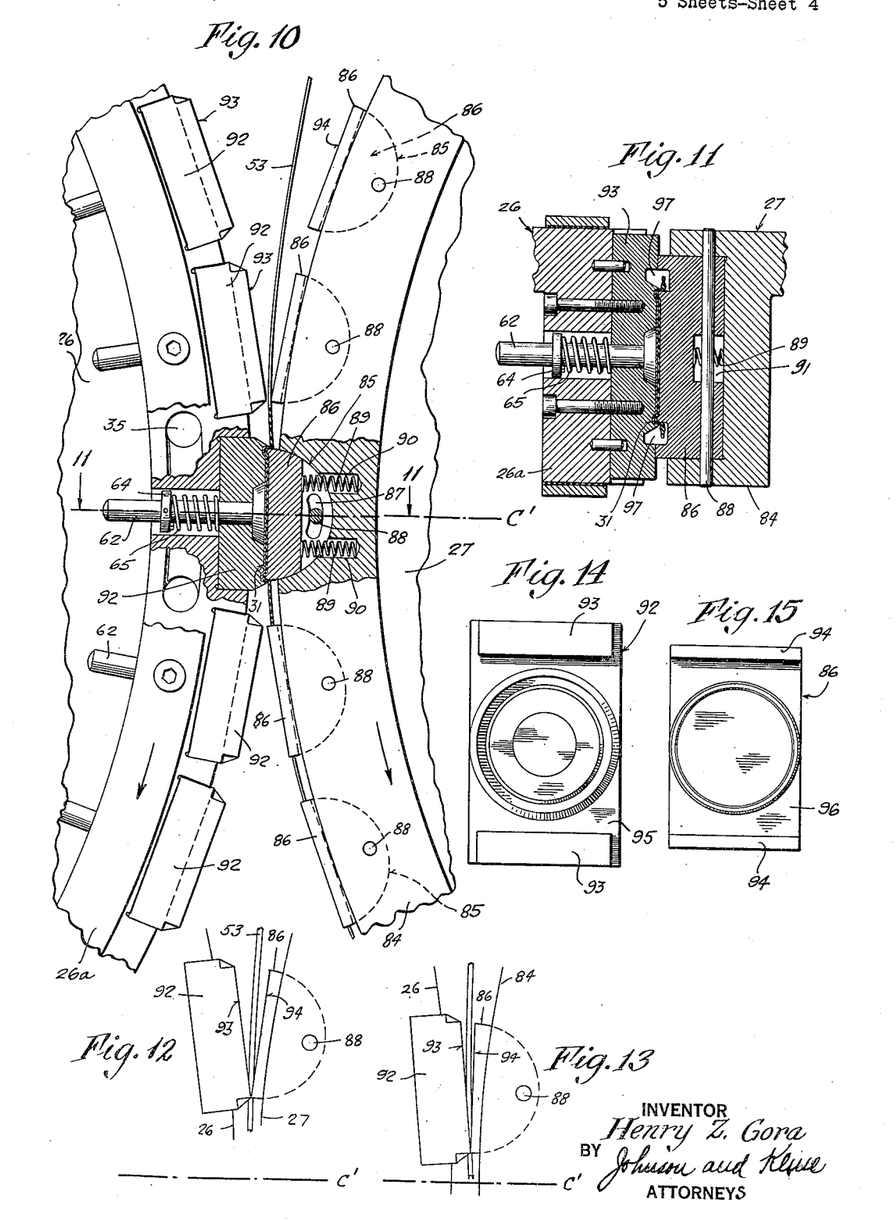
Fig. 10 is a fragmentary elevation-section of juxtaposed portions of drum peripheries illustrating a modification of the invention.
Fig. 11 is a section taken on the line 11—11 of Fig. 10.
Fig. 12 is a diagrammatic elevation of the juxtaposed portions of the drum peripheries of Fig. 10, but in a slightly advanced position.
Fig. 13 is a view similar to Fig. 12, but with the drums advanced still further.
Fig. 14 is a face view of a nest carried by a drum of Fig. 10.
Fig. 15 is a face view of a punch carried by a drum of Fig. 10.

As shown in Fig. 10, the drum 27 has a rim 84 which is provided with a plurality of semi-cylindrical recesses 85 in which are carried semi-cylindrical molding heads 86. The heads 86 have arcuate slots 87 through which retaining pins 88 extend, the latter being fixedly carried by the walls of the recesses 85 of the rim 84. The pins 88 and slots 87 permit the molding heads 86 to have limited tilting movement with respect to the rim 84 of the drum, yet the heads are prevented from dropping out of the rim. To yieldably maintain the molding heads 86 in centralized positions, a pair of helical compression springs 89 is provided for each molding head, the springs being carried in sockets 90 of the rim and extending into central slots 91 of the molding heads as shown in Figs. 10 and 11.

Cooperating surfaces are provided on nests 92 carried by the rim 26a of the drum 26, and on the molding heads 86 whereby the latter are made to align or become parallel with the nests during the molding and forming processes at the bite of the drums. Referring to Figs. 11 and 14, the nests 92 are provided with flat elongate surfaces or lands 93 along their opposite edges, and the molding heads 86 provided with lands 94 along corresponding opposite edges. The lands 93 and 94 are so arranged that when a nest and corresponding molding head are in the operative position at the bite of the drums, as shown in Fig. 10 (centralized with respect to the plane C' common to both axes of the drums), the surfaces of the lands will be in intimate engagement with each other so that the molding head may not tilt and become misaligned with respect to the nest. Also, slightly before and slightly after this position of the nest and molding head is reached, the parallelism of the molding head with the nest will be maintained. However, prior and subsequent to these latter positions, the spacing between the nest and molding head will be sufficiently great so that parallelism of the latter with respect to the nest does not exist. Such a position is shown in Fig. 13. Fig. 12 illustrates the relative positions of a nest 92 and molding head 86 as they approach the plane C' common to the axes of the drums. The lands 93 and 94 are just beginning to touch, and the moldable strip of sealing material 53 is at the point of engagement with the nest and molding head. A position in advance of that shown in Fig. 12 is illustrated in Fig. 13, wherein the engagement of the lands 93 and 94 has begun to move the molding head into parallelism with the nest. A slight tilting of the molding head 86 with respect to the rim 84 is effected by such engagement, so that the head is no longer in the centralized position maintained by the springs 89. As the drums 26 and 27 continue their rotation, and the nest 92 and molding head 86 are practically centralized with respect to the plane C', at the bite of the drums, the lands 93 and 94 will be in engagement along their entire surfaces, so that the molding head will be accurately aligned with the nest. By this construction a rolling or calendering action between the nest and molding head is avoided, and these members are made to approach each other, immediately preceding their dead center position with a bodily movement that causes the molding head to blank, and to form and bond the strip 53 at all points practically simultaneously to the lid 31. There is thus avoided any possibility of creepage of the molding material on the lid.

The separation of the molding head 86 from the coating molded and bonded to the lid 31 may occur simultaneously at all points on the coating, in distinction to the rolling type of separation occurring in the embodiment of the invention illustrated in Fig. 3.

The nest 92 and molding head 86 have surfaces 95 and 96 which are below the surfaces of the lands 93 and 94 respectively, to provide clearance for the strip 53 where it extends outside of the lid 31. As shown in Fig. 11, when the nest and molding head are closely adjacent each other, chambers 97 are formed inside of the lands 93 and 94, which chambers may be occupied by the scrap portion of the strip 53.

Although the nest 92 is shown as being fixedly carried by the rim 26a and the molding head 86 mounted to be tiltable in the rim 84, in the broader aspects of the invention the molding head may be fixedly mounted and the nest tiltably mounted, or other means providing a tiltable or floating mounting for either the nest or head may be provided.

Figure 16:
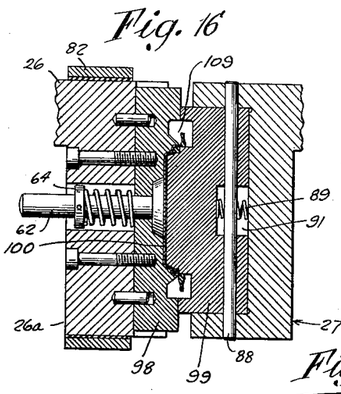
Fig. 16 is a horizontal axial section of an aligned nest and punch made according to a modification of the invention, a processed lid being shown in the nest.
Figure 17:
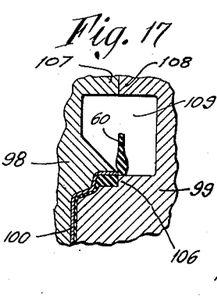
Fig. 17 is an enlarged fragmentary detail of the nest, lid, and punch of Fig. 16.
Figure 18:
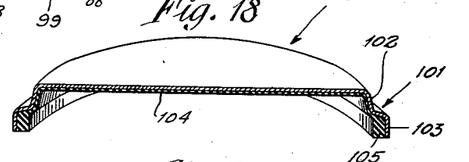
Fig. 18 is a diametric section of a lid as processed by the nest and punch of Fig. 16.

Another embodiment of the invention is shown in Figs. 16, 17 and 18 wherein a nest 98 and molding head 99 are shaped to accommodate a lid 100 having a stepped peripheral flange 101. The lid 100 may be used with a jar having a mouth shaped differently from that for which the lid 31 is intended. As clearly shown in Fig. 18, the flange 101 of the lid has a portion 102 of small diameter and a portion 103 of large diameter. The inside surface of the lid 100 and the inside surface of the portion 102 of the flange 101 has a comparatively thin coating 104 of sealing material, the latter being integral with a thick annular gasket portion 105 located within and bonded to the flange portion 103.

Referring to Figs. 16 and 17, the nest 98 is shaped to receive the lid 100 and frictionally hold the latter at the outer surface of the flange portion 103, and the molding head 99 is provided with an annular shoulder 106 adapted to form the gasket 105 and cooperate with the flange portion 103 for blanking out the moldable strip 53. The nest 98 and molding head 99 are provided with lands 107 and 108 respectively, and the surfaces of the nest and the molding head are cut away adjacent the lands so that when these parts are together channels 109 are formed, into which scrap portions 60 of the strip 53 may extend.

Figure 19:
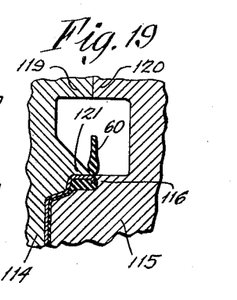
Fig. 19 is an enlarged fragmentary sectional detail similar to Fig. 17, but illustrating a further modification of the invention.
Figure 20:
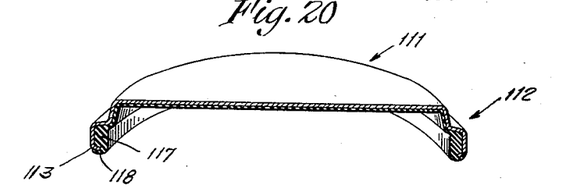
Fig. 20 is a diametric section of a lid as processed by the nest and punch of Fig. 19.

Another modification of the invention is shown in Figs. 19 and 20, wherein a lid 111 having a stepped peripheral flange 112 with an inturned edge 113, is provided with a sealing coating and gasket, the latter inclosing the inturned edge 113 of the lid.

As seen in Fig. 19 a nest 114 is provided of substantially similar shape to the nest 98, for receiving and supporting the lid 111, underside out. For cooperation with the nest 114 there is provided a molding head 115 which has an annular shoulder 116 of concave surface, the shoulder being so shaped and adapted that it will form the gasket portion 117 of the coating with a convex edge 118. The inturned edge 113 of the lid is thereby embedded in the gasket portion 117. The outer edge of the shoulder 116 of the molding head 115, as shown in Fig. 19, cooperates with the flange 112 of the lid to shear off the excess material 60 of the strip 53. The nest 114 and molding head 115 have flanges or lands 119 and 120 respectively for aligning these parts at the time that the coating is formed and molded against the lid 111.

The lip or flange 121 of the nest 114 may taper to a sharp cutting edge, and be made to extend, as shown in Fig. 19 so that it cooperates with the edge of the shoulder 116 of the molding head to blank out the material of the moldable strip 53.

Whether the calendering type of process as shown in Fig. 3, or pressing type as shown in Fig. 10 is employed, the resulting coating on the lids will be smooth and uniform, free from lumps or irregularities, so that subsequent ironing operations with their attendant expense need not be employed.

Variations and modifications may be made within the scope of this invention and portions of the improvements may be used without others.

I claim:

1. A method of producing gasket coatings on container lids formed of sheet metal having downturned peripheral flanges which comprises the steps of nesting and supporting a lid, bottom-out and flange extended, on a carrier; moving said carrier along a predetermined path; feeding a strip of moldable sealing material between said lid and a molding head; and relatively advancing and retracting the molding head with respect to said lid on the carrier and the interposed strip to press the strip against the flange of the lid and thereby blank out a portion of the strip and deposit it in the lid.

2. A method of producing gasket coatings on container lids which comprises the steps of loading a carrier with lids one at a time; nesting and supporting said lids bottom-out on said carrier; moving said carrier along a predetermined path; feeding a strip of moldable sealing material between said lid and a molding head; and periodically relatively advancing and retracting the molding head with respect to said lid on the carrier and the interposed strip to engage the strip, blank out a portion thereof, and mold and bond said blanked-out portion to the lid.

3. A method of producing gasket coatings on container lids which comprises the steps of loading a carrier with lids one at a time; nesting and supporting said lids bottom-out on said carrier; heating said carrier whereby heat is transmitted to the lids nested and supported thereon; moving said carrier along a predetermined path; feeding a strip of moldable sealing material between said lid and a molding head; and periodically relatively advancing and retracting the molding head with respect to said lid on the carrier and the interposed strip to engage the strip, blank out a portion thereof, and mold and bond said blanked-out portion to the lid.

4. A method of producing gasket coatings on container lids comprising periodically loading a carrier with lids one at a time; nesting and supporting said lids bottom-out on said carrier; moving said carrier along a predetermined path; milling a batch of moldable sealing material until it reaches the desired degree of plasticity; forming a strip from said batch of moldable sealing material; feeding said strip of moldable sealing material to a lid nested and supported on the carrier; periodically relatively advancing and retracting a molding head with respect to said lid on said carrier whereby when the molding head approaches the loaded carrier it engages the strip to blank out and mold a portion of the latter to the lid to form a gasket coating bonded thereto; and returning the blanked-out strip to be incorporated in the batch of moldable sealing material being milled, plasticized and formed into a strip.

5. A method of producing gasket coatings on container lids comprising periodically loading a carrier with lids one at a time; nesting and supporting said lids bottom-out on said carrier; moving said carrier along a predetermined path; feeding a strip of moldable sealing material to a lid nested and supported on the carrier; periodically relatively advancing and retracting a molding head with respect to said lid on said carrier whereby when the molding head approaches the loaded carrier it engages the strip and molds a portion of the latter to the lid to form a gasket coating bonded thereto; ejecting the lids from the carrier after they have been coated; and subjecting the coated lids to curing heat, after they have been ejected from the carrier, to cure the moldable material thereon.

6. In a machine for producing gasket coatings on container lids formed of sheet metal, a carrier for nesting and supporting a lid bottom side out; a molding head; means for guiding a continuous strip of moldable sealing material between a lid carried in the carrier and the head; means for mounting the molding head and carrier; and means for imparting relative advancing and retracting movement thereto, whereby when the molding head approaches the carrier it engages and simultaneously molds a portion of the strip to the lid to form a gasket coating bonded thereto.

7. In a machine for producing gasket coatings on container lids formed of sheet metal having downturned peripheral flanges, a carrier for nesting and supporting a lid, bottom out and flange extended; a molding head; and means for mounting the molding head and nest for relative advancing and retracting movement whereby a strip of moldable sealing material interposed between the head and a lid carried in the nest may be molded against and bonded to the lid, said head being shaped for cooperation with the flange of a lid to thereby blank out a portion of the strip for the molding.

8. A machine for producing gasket coatings on container lids, comprising a carrier for nesting and supporting a lid, bottom-out; means for periodically loading the carrier with lids one at a time; a molding head; means for periodically relatively advancing and retracting the molding head and the carrier; and means for feeding a strip of moldable sealing material to a lid carried by the carrier whereby when the molding head approaches the loaded carrier it engages the strip and molds a portion of the latter to the lid to form a gasket coating bonded thereto.

9. The invention as defined in claim 8 in which there are means for heating the carrier so that the heat therefrom is transmitted to the lids to aid in molding the coating and bonding same thereto.

10. A machine for producing gasket coatings on container lids, comprising a rotary drum; a plurality of nests carried by the drum each for receiving a lid, and carrying same bottomside out in a succession along a circular path; a plurality of molding heads; a rotary drum for mounting the molding heads for movement in a circular path coordinately with the nest-carried lids whereby the molding heads consecutively approach, travel with, and withdraw from respective successive lid nests; and means for feeding a strip of moldable sealing material between the molding heads and the lids carried in the said nests whereby when the heads and nests approach each other portions of the strip are pressed by engagement with the heads and molded against the container lids, to form sealing coatings thereon.

11. A machine for producing gasket coatings on container lids, comprising a rotary drum; a plurality of nests carried by the drum each for receiving a lid, and carrying the same bottom side out in a succession along a circular path, said nests being slightly larger in size than the lids; means for automatically pressing the lids into the nests as the drum rotates so that the lids are frictionally gripped by the nests; a plurality of molding heads; means positioning gasket coating material between the lid-carrying nests and the molding heads; and a rotary drum for mounting the molding heads for movement in a circular path coordinately with the nest-carried lids whereby the molding heads consecutively approach, press against and withdraw from respective successive lids in said nests, and in so doing mold upon and bond to each successive lid a gasket coating.

12. A machine for producing gasket coatings on container lids, comprising a carrier for nesting and supporting a lid bottomside out; means for periodically loading the carrier with lids one at a time; a molding head; means for periodically relatively advancing and retracting the molding head and the carrier; a mill for producing the desired degree of plasticity of a moldable sealing composition; and means for taking from the mill and feeding a strip of moldable sealing material to a lid carried in the carrier whereby when the molding head approaches the loaded carrier it engages the strip and molds a portion of the latter to the lid to form a gasket coating bonded thereto, said head operating to blank out the portion of the strip being molded.

13. A machine for producing gasket coatings on container lids, comprising a carrier for nesting and supporting a lid bottomside out; means for periodically loading the carrier with lids one at a time; a molding head; means for periodically relatively advancing and retracting the molding head and the carrier; a mill for producing the desired degree of plasticity of a moldable sealing composition; means for taking from the mill and feeding a strip of moldable sealing material to a lid carried in the carrier whereby when the molding head approaches the loaded carrier it engages the strip and molds a portion of the latter to the lid to form a gasket coating bonded thereto, said head operating to blank out the portion of the strip being molded; and means for feeding the blanked-out strip back to the mill so that the excess material may be used to make additional strip material.

14. The invention as defined in claim 8 in which the carrier has a recess slightly larger than the lids, and in which there are means for automatically pressing the lids into the recess so that they are frictionally held thereby, said means comprising a plunger having a floating head for engagement with the lid whereby the head will be automatically positioned by such engagement, thereby to equalize the pressure it applies.

15. The invention as defined in claim 7 in which the carrier has a recess for receiving the lid, the walls of the recess frictionally engaging the outside of the flange of the lid, and said walls having tapering sections forming sharp edges adjacent the edge of the lid flange so that the blanking of the strip by the flange and head is not interfered with.

16. A machine for producing gasket coatings on sheet metal lids for containers, comprising a pair of drums mounted one ahead of the other, the peripheries of the drums extending adjacent each other at one point, and one of said drums having a plurality of nests on its periphery, each nest being adapted to receive and hold bottom-outward one of said container lids; means for driving the drums in opposite directions; feeding means adapted to carry a plurality of stacked lids and to feed same consecutively into the said nests as the drums rotate; a plurality of molding heads on the periphery of the other drum, located to move in registration respectively with the nests of the said one drum where the peripheries of the drums are adjacent each other; and means for feeding a strip of moldable sealing material between the peripheries of the drums whereby when the heads and nests approach each other portions of the strip are compressed by engagement with the heads and molded against the container lids carried in the nests, to form sealing coatings on the lids.

17. A machine for producing gasket coatings on container lids formed of sheet metal having downturned flanges, comprising a pair of drums mounted one ahead of the other, the peripheries of the drums extending adjacent each other at one point, and one of said drums having a plurality of nests on its periphery, each nest being adapted to receive and hold bottom-outward one of said container lids; means for driving the drums in opposite directions; a plurality of molding heads on the periphery of the other drum, located to move in registration respectively with the nests of the said one drum where the peripheries of the drums are adjacent each other; a rubber mill; means for feeding a strip of moldable rubber from the mill between the peripheries of the drums whereby when the heads and nests approach each other portions of the strip are engaged by the heads and forced against the container lids in the nests, the molding heads and the flanges of the lids cooperating to blank out parts of the strip, and the heads molding said parts to form sealing coatings on the lids; and means for leading the blanked strip around one of said drums and back into the mill so that the excess rubber of the strip may be used to make additional strip material.

18. A machine for producing gasket coatings on container lids formed of sheet metal having downturned flanges, comprising a pair of drums mounted one ahead of the other, the peripheries of the drums extending adjacent each other at one point, and one of said drums having a plurality of nests on its periphery, each nest being adapted to receive and hold bottom-outward one of said container lids; means for driving the drums in opposite directions; feeding means adapted to carry a plurality of stacked lids and to feed same consecutively into the said nests as the drums rotate; a plurality of molding heads on the periphery of the other drum, located to move in registration respectively with the nests of the said one drum where the peripheries of the drums are adjacent each other; and means for feeding a strip of moldable sealing material between the peripheries of the drums whereby when the heads and nests approach each other portions of the strip are engaged by the heads and forced against the container lids in the nests, the molding heads and the flanges of the lids cooperating to blank out parts of the sheet, and the heads molding said parts to form sealing coatings on the lids.

19. A machine for producing gasket coatings on container lids, comprising a carrier member for nesting and supporting a lid, bottom out; means for periodically loading the carrier member with lids one at a time; a molding member; means for periodically relatively advancing and retracting the molding and carrier members; and means for feeding a strip of moldable sealing material to a lid carried by the carrier member whereby when the molding member approaches the loaded carrier member it engages the strip and molds a portion of the latter to the lid to form a gasket coating bonded thereto, said members having mutually engageable surfaces, and one of said members being tiltably mounted with respect to the other so that when the members are brought together they will be positioned with respect to each other by engagement of said surfaces, thereby to maintain uniformity of thickness of the gasket coatings.

20. The invention as defined in claim 8 in which there are means for heating lids when the latter are in the carrier.

21. The invention as defined in claim 8 in which the carrier has a recess for receiving the lid, the walls of the recess and the said molding head having surfaces cooperating to blank out the portion of the strip molded to the lid by the head.

22. A machine for producing gasket coatings on container lids, comprising a carrier for nesting and supporting a lid, bottom-out; means for periodically loading the carrier with lids one at a time; a molding head; means for periodically relatively advancing and retracting the molding head and the carrier; means for feeding a strip of moldable sealing material to a lid carried by the carrier whereby when the molding head approaches the loaded carrier it engages the strip and molds a portion of the latter to the lid to form a gasket coating bonded thereto; means for ejecting the lids from the carrier after they have been coated; and means for subjecting the coated lids to curing heat after they are ejected from the carrier, to cure the molding material thereon.

23. A machine for producing gasket coatings on container lids, comprising a carrier for nesting and supporting a lid, bottom out; means for periodically loading the carrier with lids one at a time; a molding head; means for periodically relatively advancing and retracting the molding head and the carrier; means for feeding a strip of moldable sealing material to a lid carried by the carrier whereby when the molding head approaches the loaded carrier it engages the strip and molds a portion of the latter to the lid to form a gasket coating bonded thereto; means for ejecting the lids from the carrier after they have been coated; a conveyor for receiving the lids from the carrier and carrying same away; and an oven through which the conveyor passes, for heating the ejected lids to cure the molded material thereon.

24. A machine comprising a rotary carrier, lid-supporting and positioning means mounted on the carrier and traveling by the rotation thereof in a circular path, a blanking and molding head, means for positioning a piece of gasket material between said molding head and said lid-supporting means, and means for relatively advancing and retracting said molding head and said lid-supporting means to cause the head to penetrate said gasket material to blank a portion therefrom and simultaneously mold said blanked portion to the lid to form a gasket thereon.

25. A machine comprising a rotary carrier, lid-supporting and positioning means mounted on the carrier and traveling by the rotation thereof in a circular path, a blanking and molding head, means for guiding a continuous strip of gasket material between said molding head and said lid-supporting means, and means for relatively advancing and retracting said molding head and said lid-supporting means whereby when said head approaches a lid supported therein it penetrates said strip to blank a portion therefrom and simultaneously mold said blanked portion to the lid to form a gasket thereon.

26. In the process of producing sealing closures for containers, the steps of supplying closures in gasket-receiving position milling between mill rollers a blank of plastic gasket material until one of the mill rollers has an enveloping surface layer of plasticized material of the desired degree of plasticity and of predetermined thickness; cutting from part of the layer on the mill roller a continuous ribbon of plasticized material slightly wider than the gasket to be formed, the gap thus formed in the layer being continuously filled by distribution of the bank between the mill rollers; guiding said ribbon to a blanking zone; there passing the ribbon between punch and die elements to cut gasket blanks from the ribbon and deposit the same in the closures; and guiding the skeletonized ribbon from which the blanks are cut back to the mill roller to commingle with the bank of material thereon.

27. In apparatus for applying gaskets to the undersides of closures for containers, means for plasticizing a quantity of moldable vulcanizable gasket material and producing a continuous strip of said material; traveling supporting means having nests for supporting and positioning closures; means for guiding the strip of gasket material from the plasticizing means to a cutting position over said supporting means; means located over said supporting means and in the path of the strip for successively cutting and completely severing a piece of said gasket material from said strip and depositing the same in said closures and adhering the same thereto; and means for feeding the blanked out strip of gasket material back to the plasticizing means to commingle with the material therein.

HENRY Z. GORA.

REFERENCES CITED

The following references are of record in the file of this patent:

UNITED STATES PATENTS

| Number | Name | Date |
| --- | --- | --- |
| 1,451,470 | Peelle | Apr. 10, 1923 |
| 1,465,101 | Towle | Aug. 14, 1923 |
| 1,486,937 | Taliaferro | Mar. 18, 1924 |
| 1,899,524 | Parks | Feb. 28, 1933 |
| 1,996,048 | Madina | Mar. 26, 1935 |
| 2,103,860 | Mazzeo | Dec. 28, 1937 |

FOREIGN PATENTS

| Number | Country | Date |
| --- | --- | --- |
| 439,684 | Germany | Jan. 17, 1927 |